United States Patent
Yuan et al.

(10) Patent No.: US 12,427,445 B2
(45) Date of Patent: Sep. 30, 2025

(54) TWO-COMPONENT FOAM INHIBITOR AND PREPARATION METHOD, AND METHOD FOR REDUCING FOAMING IN PRODUCTION OF UREA HUMATE

(71) Applicant: INST OF AGRI RESOURCES AND REGIONAL PLANNING, CAAS, Beijing (CN)

(72) Inventors: Liang Yuan, Beijing (CN); Bing-qiang Zhao, Beijing (CN); Yan-ting Li, Beijing (CN); Jiu-kai Xu, Beijing (CN); Shui-qin Zhang, Beijing (CN); Meng Xu, Beijing (CN); Wei Wang, Beijing (CN); Yan-ge Yan, Beijing (CN)

(73) Assignee: Inst Of Agri Resources And Regional Planning, CAAS, Beijing (CN)

( * ) Notice: Subject to any disclaimer, the term of this patent is extended or adjusted under 35 U.S.C. 154(b) by 0 days.

(21) Appl. No.: 18/992,142

(22) PCT Filed: Jan. 8, 2024

(86) PCT No.: PCT/CN2024/071125
§ 371 (c)(1),
(2) Date: Jan. 7, 2025

(87) PCT Pub. No.: WO2025/147806
PCT Pub. Date: Jul. 17, 2025

(65) Prior Publication Data
US 2025/0222374 A1     Jul. 10, 2025

(51) Int. Cl.
*C05C 9/00* (2006.01)
*B01D 19/04* (2006.01)
(52) U.S. Cl.
CPC ............ *B01D 19/0495* (2013.01); *C05C 9/00* (2013.01)

(58) Field of Classification Search
CPC .......................... C05C 9/00–005; C05G 3/90
See application file for complete search history.

(56) References Cited

U.S. PATENT DOCUMENTS 3,751,263 A * 8/1973 Hall ................... B01D 19/0404
426/271
6,231,632 B1 * 5/2001 Gruber ................... C07C 273/02
516/77

FOREIGN PATENT DOCUMENTS

CN      102584498 A      7/2012
CN      107556094 A  *  1/2018
(Continued)

OTHER PUBLICATIONS

Machine Translation of CN107556094A. Jan. 9, 2018. (Year: 2018).*
(Continued)

*Primary Examiner* — Stephen E Rieth
(74) *Attorney, Agent, or Firm* — Fish IP Law, LLP

(57) ABSTRACT

The present disclosure belongs to the technical field of value-added urea preparation, and specifically relates to a two-component foam inhibitor and a preparation method thereof, and a method for reducing foaming in production of urea humate. In the present disclosure, a foam control agent in the two-component foam inhibitor lowers a pH value of a humate solution to reduce the production of ammonia in a urea melt, and can avoid condensation of the humate solution caused by lowering the pH value and a difficulty in adding the humate solution to the urea melt. A suspension adsorbent in the two-component foam inhibitor can adsorb free ammonia in the urea melt and ammonia generated after adding the humate solution. In summary, the two-component foam inhibitor can effectively reduce a foaming reaction during production of the urea humate, avoid powdering of urea humate particles, and improve a production efficiency.

4 Claims, 2 Drawing Sheets

(56) References Cited

FOREIGN PATENT DOCUMENTS

| | | | |
|---|---|---|---|
| CN | 111574278 | A | 8/2020 |
| CN | 112512658 | A | 3/2021 |
| CN | 113860944 | A | 12/2021 |
| CN | 116347979 | A | 6/2023 |
| JP | 5228309 | A | 9/1993 |

OTHER PUBLICATIONS

Machine Translation of CN102584498A. Jul. 18, 2012. (Year: 2012).*
International Search Report of International application No. PCT/CN2024/071125, issued Sep. 9, 2024.
Written Comment of International Searching Authority International application No. PCT/CN2024/071125, issued Sep. 9, 2024.

* cited by examiner

TWO-COMPONENT FOAM INHIBITOR AND PREPARATION METHOD, AND METHOD FOR REDUCING FOAMING IN PRODUCTION OF UREA HUMATE

CROSS REFERENCE TO RELATED APPLICATION

This patent is a national stage application of International Patent Application No. PCT/CN2024/071125, filed on Jan. 8, 2024.

TECHNICAL FIELD

The present disclosure belongs to the technical field of value-added urea preparation, and specifically relates to a two-component foam inhibitor and a preparation method thereof, and a method for reducing foaming in production of urea humate.

BACKGROUND

Urea humate has the effect of inhibiting soil urease activity, slowing down the conversion of urea, and reducing ammonia volatilization losses, and has been widely welcomed by urea production enterprises and farmers in recent years. At present, the annual production of urea humate in China is about 1 million tons, accounting for ⅓ of Chinese value-added urea production.

However, humic acid needs to be added into urea in the form of a humate solution. Since humates (such as potassium humate and sodium humate) are alkaline and can generate a large amount of ammonia gas instantly after being added to the urea melt, serious foaming occurs in the urea melt, leading to the following problems: 1) the urea humate granules produced contain air bubbles, have low strength, and are easily broken during storage and transportation; 2) the urea humate has a lot of dust, which reduces the production efficiency and increases additional costs for recycling; 3) the enthusiasm of urea companies is affected in producing urea humate; 4) the product with a lot of dust may also affect farmers' enthusiasm for application. Therefore, it is an important part for promoting the healthy development of urea humate industry by avoiding the foaming in production of the urea humate.

The humate solution only shows desirable fluidity under alkaline conditions and can be accurately added into the urea melt through a metering pump. As a result, adjusting a pH value of the humate solution is an effective way to reduce the foaming of the urea melt. However, after the pH is lowered to a moderately acidic state, the humate solution may condense and precipitate, making it difficult to add the humate solution into the urea melt.

SUMMARY

An objective of the present disclosure is to provide a two-component foam inhibitor and a preparation method thereof, and a method for reducing foaming in production of urea humate. In the present disclosure, the two-component foam inhibitor can prevent the humate solution from condensing under non-alkaline conditions and effectively reduce foaming during the production of urea humate.

To achieve the above objective, the present disclosure provides the following technical solutions:

The present disclosure provides a two-component foam inhibitor, including a foam control agent and a suspension adsorbent; where
  raw materials of the foam control agent include lactic acid, acetic acid, and a metal oxide;
  raw materials of the suspension adsorbent include a vegetable oil, a glycan, an organic acid, and an adsorbent; and
  the glycan has a polymerization degree of 3 to 10, and the organic acid excludes the lactic acid and the acetic acid.

Preferably, the metal oxide is one or more selected from the group consisting of zinc oxide, copper oxide, ferric oxide, manganese oxide, and calcium oxide;
  the lactic acid is a lactic acid solution, and the lactic acid solution has a mass concentration of 85%; and
  the acetic acid is an acetic acid solution, and the acetic acid solution has a mass concentration of 80%.

Preferably, the lactic acid solution and the acetic acid solution are at a mass ratio of (300-400):(100-200); and the lactic acid and the metal oxide are at a mass ratio of (300-400):(120-160).

Preferably, the vegetable oil and the glycan are at a mass ratio of (500-600):(200-300);
  the vegetable oil and the organic acid are at a mass ratio of (500-600):(50-100); and
  a total mass of the vegetable oil, the glycan, and the organic acid and a mass of the adsorbent are at a ratio of 1000:(30-100).

Preferably, the vegetable oil is one or more selected from the group consisting of palm oil, corn oil, and cottonseed oil;
  the glycan is one or more selected from the group consisting of maltooligosaccharide (MOS), isomaltooligosaccharide (IMO), fructooligosaccharide (FOS), galactooligosaccharide (GOS), and xylooligosaccharide (XOS);
  the organic acid is an organic carboxylic acid; and
  the adsorbent is one or more selected from the group consisting of a silica gel powder and zeolite powder.

The present disclosure further provides a preparation method of the two-component foam inhibitor, including the following steps:
  (1) mixing the lactic acid, the acetic acid, and the metal oxide with water and heating to allow double replacement to obtain the foam control agent; and
  (2) mixing the vegetable oil, the glycan, and the organic acid and heating to obtain a viscous liquid, and then mixing the viscous liquid with the adsorbent to obtain the suspension adsorbent; where
  steps (1) and (2) are conducted in any order.

The present disclosure further provides a method for reducing foaming in production of urea humate, including a first evaporation section and a second evaporation section, where a process between the first evaporation section and the second evaporation section includes the following steps:
  (1) mixing a suspension adsorbent with a urea melt to obtain a urea premix;
  (2) mixing a humate solution and a foam control agent and heating to obtain a humate premix; and
  (3) mixing the urea premix with the humate premix.

Preferably, the suspension adsorbent and the urea melt are at a volume-to-mass ratio of (2-5) L:1 t;
  the foam control agent and the humate solution are at a volume ratio of (50-200):500; and
  the humate solution has a mass concentration of 10% to 18%.

Preferably, the humate premix and the urea melt are at a volume-to-mass ratio of (8-20) L:1 t.

Preferably, the mixing and heating is conducted at 60° C. to 80° C.

The present disclosure provides a two-component foam inhibitor. In the present disclosure, a foam control agent in the two-component foam inhibitor lowers a pH value of a humate solution to reduce the production of ammonia in a urea melt. In addition, the lactic acid and acetic acid form complexes with metal ions in the metal oxide, and the complexes can avoid the combination of humic acid and metal ions to form precipitation in the short term, thus avoiding condensation of the humate solution caused by lowering the pH value and a difficulty in adding the humate solution to the urea melt. A suspension adsorbent in the two-component foam inhibitor can adsorb free ammonia in the urea melt and ammonia generated after adding the humate solution. Accordingly, the two-component foam inhibitor can effectively reduce a foaming reaction during production of the urea humate, avoid powdering of urea humate particles, and improve a production efficiency.

The present disclosure further provides a preparation method of the two-component foam inhibitor. In the present disclosure, the preparation method has simple steps, convenient operation, and high feasibility, and shows a prospect of large-scale industrial production.

The present disclosure further provides a method for reducing foaming in production of urea humate. In the present disclosure, the foam control agent and the suspension adsorbent in the two-component foam inhibitor are mixed with the humate solution and then added into the urea melt. Through the two directions of early adsorption and late buffering, the production of ammonia gas during the production of urea humate is greatly reduced, thereby eliminating air bubbles, improving the urea granulation rate, increasing particle strength, reducing dust generation, and improving production efficiency.

BRIEF DESCRIPTION OF THE DRAWINGS

To describe the technical solutions in embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

DETAILED DESCRIPTION OF THE EMBODIMENTS

Figure 1:
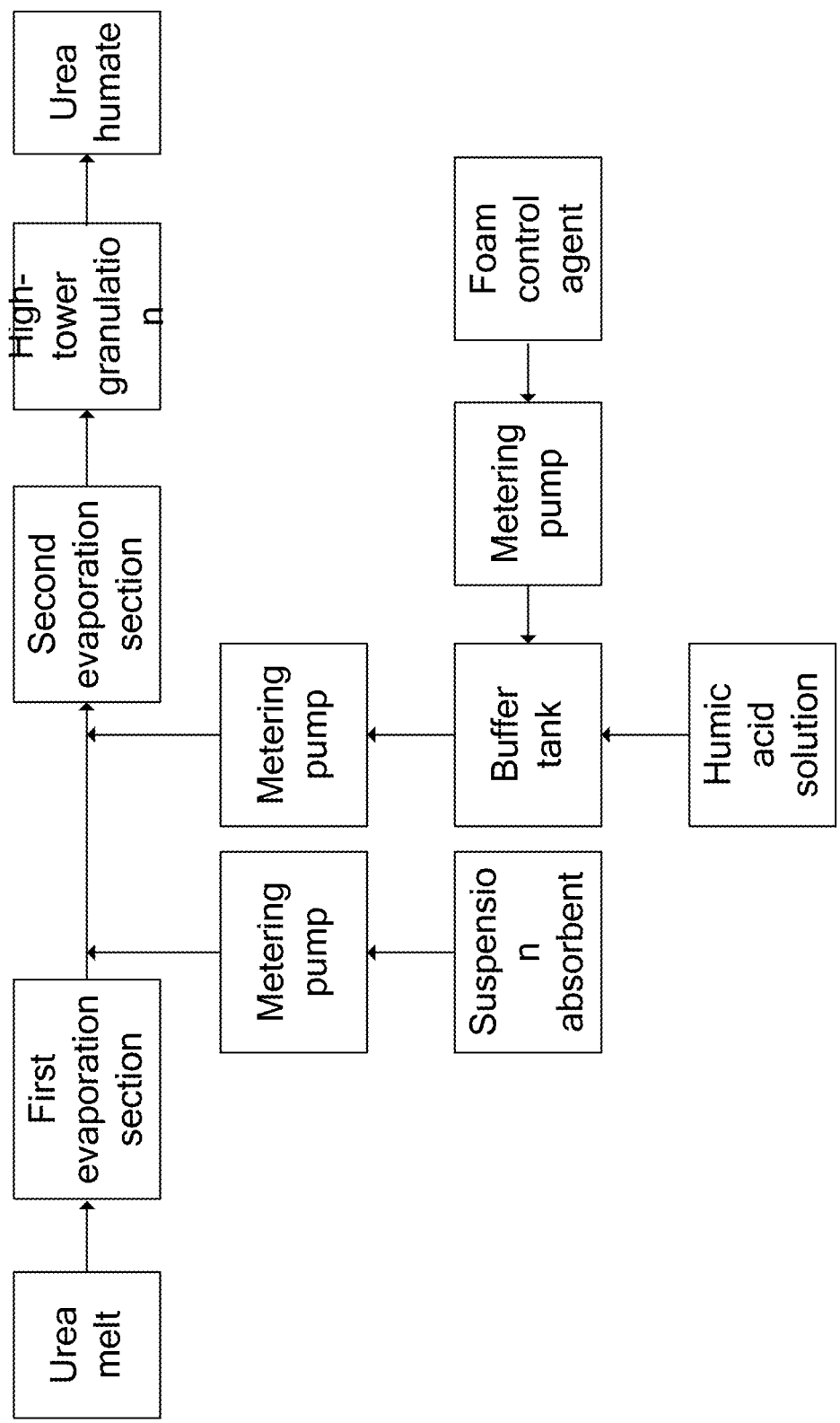
FIG. 1 shows a process flow diagram of the method for reducing foaming in production of urea humate provided in the present disclosure.
Figure 2:
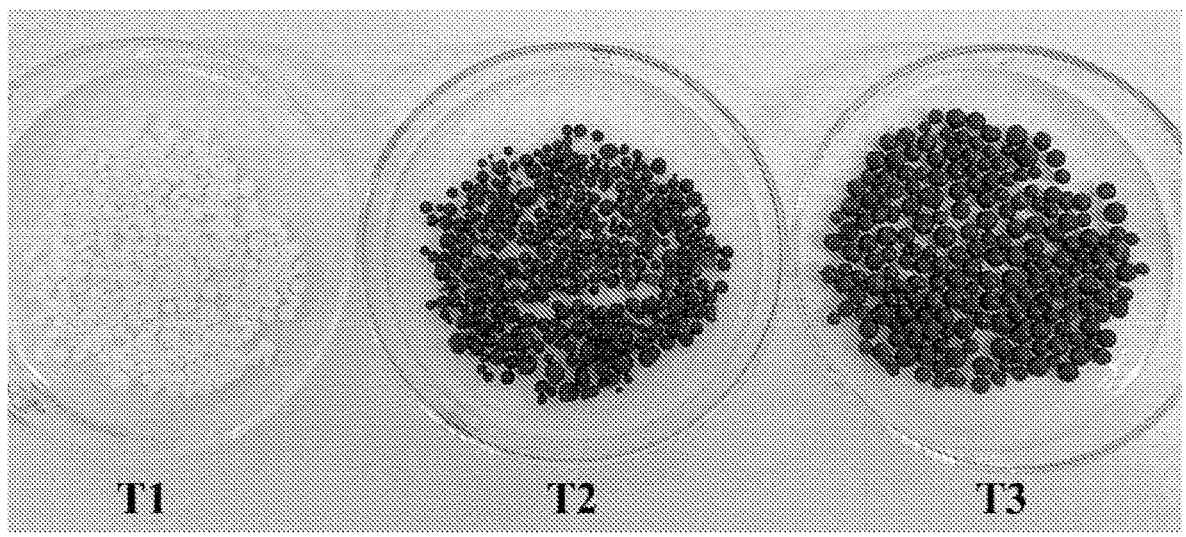

The present disclosure provides a two-component foam inhibitor, including a foam control agent and a suspension adsorbent; where
raw materials of the foam control agent include lactic acid, acetic acid, and a metal oxide;
raw materials of the suspension adsorbent include a vegetable oil, a glycan, an organic acid, and an adsorbent; and
the glycan has a polymerization degree of 3 to 10, and the organic acid excludes the lactic acid and the acetic acid.

In the present disclosure, the two-component foam inhibitor includes a foam control agent; and raw materials of the foam control agent include lactic acid, acetic acid, and a metal oxide. The metal oxide preferably includes one or more of zinc oxide, copper oxide, ferric oxide, manganese oxide, and calcium oxide; the lactic acid is preferably a lactic acid solution; the lactic acid solution has a mass concentration of preferably 85%; the acetic acid is preferably an acetic acid solution; the acetic acid solution has a mass concentration of preferably 80%.

In the present disclosure, the lactic acid solution and the acetic acid solution are at a mass ratio of preferably (300-400):(100-200), more preferably (320-380):(120-180), and even more preferably (340-360):(140-160).

In the present disclosure, the lactic acid and the metal oxide are at a mass ratio of preferably (300-400):(120-160), more preferably (320-380):(130-150), and even more preferably (340-360):140.

In the present disclosure, the two-component foam inhibitor includes a suspension adsorbent; and raw materials of the suspension adsorbent include a vegetable oil, a glycan, an organic acid, and an adsorbent. The vegetable oil preferably includes one or more of palm oil, corn oil, and cottonseed oil; the glycan preferably includes one or more of MOS, IMO, FOS, GOS, and XOS; the glycan has a polymerization degree of preferably 3 to 9, more preferably 4 to 8, and even more preferably 5 to 7; the organic acid is preferably an organic carboxylic acid; the organic carboxylic acid preferably includes one or more of a dicarboxylic acid and a polycarboxylic acid; the dicarboxylic acid preferably includes one or more of oxalic acid, malic acid, and succinic acid; the polycarboxylic acid is preferably citric acid; the adsorbent preferably includes one or more of a silica gel powder and a zeolite powder; the adsorbent has a fineness of preferably not less than 300 mesh, more preferably not less than 500 mesh, and even more preferably 500 mesh to 700 mesh.

In the present disclosure, the vegetable oil and the glycan are at a mass ratio of preferably (500-600):(200-300), more preferably (520-580):(220-280), and even more preferably (540-560):(240-260).

In the present disclosure, the vegetable oil and the organic acid are at a mass ratio of preferably (500-600):(50-100), more preferably (520-580):(60-90), and even more preferably (540-560):(70-80).

In the present disclosure, a total mass of the vegetable oil, the glycan, and the organic acid and a mass of the adsorbent are at a ratio of preferably 1000:(30-100), more preferably 1000:(50-90), and even more preferably 1000:(60-70).

The present disclosure further provides a preparation method of the two-component foam inhibitor, including the following steps:
(1) mixing the lactic acid, the acetic acid, and the metal oxide with water and heating to allow double replacement to obtain the foam control agent; and
(2) mixing the vegetable oil, the glycan, and the organic acid and heating to obtain a viscous liquid, and then mixing the viscous liquid with the adsorbent to obtain the suspension adsorbent; where
steps (1) and (2) are conducted in any order.

In the present disclosure, the lactic acid, the acetic acid, and the metal oxide are mixed with water and heated (denoted as first mixing and heating) to allow double replacement to obtain the foam control agent. The foam control agent has a solid content of preferably 100 g/L to 200 g/L, more preferably 120 g/L to 180 g/L, and even more preferably 140 g/L to 160 g/L.

In the present disclosure, the first mixing and heating is conducted at preferably 60° C. to 80° C., more preferably 65° C. to 75° C., and even more preferably 70° C.

In the present disclosure, the double replacement is preferably conducted in a reactor at preferably 60° C. to 80° C., more preferably 65° C. to 75° C., and even more preferably 70° C. for preferably 15 min to 30 min, more preferably 20 min to 25 min under preferably stirring.

In the present disclosure, the vegetable oil, the glycan, and the organic acid are mixed and heated (denoted as second mixing and heating) to obtain a viscous liquid, and then mixing the viscous liquid with the adsorbent to obtain the suspension adsorbent. The second mixing and heating is preferably conducted without water at preferably 100° C. to 120° C., more preferably 105° C. to 115° C., and even more preferably 110° C. for preferably 30 min to 60 min, more preferably 40 min to 50 min in preferably a reactor.

The present disclosure further provides a method for reducing foaming in production of urea humate, including a first evaporation section and a second evaporation section, where a process between the first evaporation section and the second evaporation section includes the following steps:
(1) mixing a suspension adsorbent with a urea melt to obtain a urea premix;
(2) mixing a humate solution and a foam control agent and heating to obtain a humate premix; and
(3) mixing the urea premix with the humate premix.

In the present disclosure, a suspension adsorbent is mixed with a urea melt to obtain a urea premix. The suspension adsorbent and the urea melt are at a volume-to-mass ratio of preferably (2-5) L:1 t, more preferably (3-5) L:1 t, and even more preferably (3-4) L:1 t; the suspension adsorbent is preferably weighed using a metering pump.

In the present disclosure, a humate solution and a foam control agent are mixed and heated (denoted as third mixing and heating) to obtain a humate premix. The foam control agent and the humate solution are at a volume ratio of preferably (50-200):500, more preferably (80-180):500, and even more preferably (120-150):500; the humate solution has a mass concentration of preferably 10% to 18%, more preferably 12% to 16%, and even more preferably 14%.

In the present disclosure, the third mixing and heating is conducted at preferably 60° C. to 80° C., more preferably 65° C. to 75° C., and even more preferably 70° C. in preferably a buffer tank equipped with a stirring and heating insulation system.

In the present disclosure, the urea premix is mixed with the humate premix. The humate premix and the urea melt are at a volume-to-mass ratio of preferably (8-20) L:1 t, more preferably (10-17) L:1 t, and even more preferably (12-15) L:1 t.

In the present disclosure, the humate premix is preferably weighed using a metering pump.

FIG. 1 shows a process flow diagram of the method for reducing foaming in production of urea humate provided in the present disclosure. In the present disclosure, based on the process of preparing urea humate, the suspension adsorbent is weighed by a metering pump between the first evaporation section and the second evaporation section and mixed with the urea melt to obtain a urea premix. The humate solution and foam control agent are weighed by a metering pump and then heated and mixed in a buffer tank to get humate premix; the obtained humate premix is weighed and mixed with the urea premix by a metering pump. The urea humate is obtained through two-stage evaporation and high-tower granulation, thereby effectively reducing the foaming phenomenon during the production of urea humate.

In order to further illustrate the present disclosure, the technical solutions provided by the present disclosure are described in detail below in connection with accompanying drawings and examples, but these examples should not be understood as limiting the claimed scope of the present disclosure.

Example 1

In this example, a preparation method of a two-component foam inhibitor included the following steps:
(1) Preparation of a Foam Control Agent Lactic acid with a mass concentration of 85%, acetic acid solution with a mass concentration of 80%, and calcium oxide were added into a reactor at a mass ratio of 300:100:120, water was added into the reactor, and heated to 60° C. to allow reaction by stirring for 30 min to obtain the foam control agent with a concentration of 100 g/L.
(2) Preparation of a Suspension Adsorbent Vegetable oil, glycan with a polymerization degree of 3 to 10, and organic acid were mixed according to a mass ratio of 500:200:50, heated to 100° C. in a reactor without water and held for 60 min to obtain a viscous liquid; an adsorbent with a fineness of not less than 300 mesh was added into the viscous liquid according to a mass ratio of adsorbent to viscous liquid of 30:1000, and stirred evenly to obtain the suspension adsorbent.

The vegetable oil was palm oil; the glycan was MOS; the organic acid was oxalic acid; and the adsorbent was a silica gel powder.

Example 2

In this example, a preparation method of a two-component foam inhibitor included the following steps:
(1) Preparation of a Foam Control Agent Lactic acid with a mass concentration of 85%, acetic acid solution with a mass concentration of 80%, and zinc oxide were added into a reactor at a mass ratio of 400:200:160, water was added into the reactor, and heated to 80° C. to allow reaction by stirring for 15 min to obtain the foam control agent with a concentration of 200 g/L.
(2) Preparation of a Suspension Adsorbent Vegetable oil, glycan with a polymerization degree of 3 to 10, and organic acid were mixed according to a mass ratio of 600:300:100, heated to 120° C. in a reactor without water and held for 30 min to obtain a viscous liquid; an adsorbent with a fineness of not less than 300 mesh was added into the viscous liquid according to a mass ratio of adsorbent to viscous liquid of 100:1000, and stirred evenly to obtain the suspension adsorbent.

The vegetable oil was corn oil; the glycan was IMO; the organic acid was citric acid; and the adsorbent was a zeolite powder.

Example 3

In this example, a preparation method of a two-component foam inhibitor included the following steps:
(1) Preparation of a Foam Control Agent Lactic acid with a mass concentration of 85%, acetic acid solution with a mass concentration of 80%, and manganese oxide were added into a reactor at a mass ratio of 350:150:140, water was added into the reactor, and heated to 70° C. to allow reaction by stirring for 20 min to obtain the foam control agent with a concentration of 150 g/L.
(2) Preparation of a Suspension Adsorbent Vegetable oil, glycan with a polymerization degree of 3 to 10, and organic acid were mixed according to a mass ratio of 550:250:80, heated to 110° C. in a reactor without water and held for 50 min to obtain a viscous liquid; an adsorbent with a fineness of not less than 300 mesh was added into the viscous liquid according to a mass ratio of adsorbent to viscous liquid of 60:1000, and stirred evenly to obtain the suspension adsorbent.

The vegetable oil was cottonseed oil; the glycan was FOS; the organic acid was malic acid; and the adsorbent was a silica gel powder.

Example 4

In this example, a preparation method of a two-component foam inhibitor included the following steps:
(1) Preparation of a Foam Control Agent Lactic acid with a mass concentration of 85%, acetic acid solution with a mass concentration of 80%, and copper oxide and ferric oxide (the copper oxide and ferric oxide with a mass ratio of 1:1) were added into a reactor at a mass ratio of 300:200:130, water was added into the reactor, and heated to 75° C. to allow reaction by stirring for 25 min to obtain the foam control agent with a concentration of 180 g/L.
(2) Preparation of a Suspension Adsorbent Vegetable oil, glycan with a polymerization degree of 3 to 10, and organic acid were mixed according to a mass ratio of 580:230:65, heated to 105° C. in a reactor without water and held for 45 min to obtain a viscous liquid; an adsorbent with a fineness of not less than 300 mesh was added into the viscous liquid according to a mass ratio of adsorbent to viscous liquid of 35:1000, and stirred evenly to obtain the suspension adsorbent.

The vegetable oil was cottonseed oil; the glycan was GOS; the organic acid was succinic acid; and the adsorbent was a zeolite powder.

Use Example 1

After the first evaporation section and before the second evaporation section:
(1) The suspension adsorbent was added into a urea melt with a metering pump at an amount of 2 L per ton of urea, such that free ammonia in the urea melt and ammonia generated by adding the humate solution were absorbed to obtain a urea premix.
(2) The humate solution at 60° C. with 10% mass concentration was added into a buffer tank equipped with a stirring and heating insulation system (maintained at 60° C.), and the foam control agent at 60° C. and the humate solution were mixed at a volume ratio of 50:500 and added into the buffer tank to obtain a humate premix. The humate premix was added into the urea premix via a metering pump (before the second evaporation section and after the suspension adsorbent was added), where 8 L of the humate premix was added per ton of urea.

Use Example 2

After the first evaporation section and before the second evaporation section:
(1) The suspension adsorbent was added into a urea melt with a metering pump at an amount of 5 L per ton of urea, such that free ammonia in the urea melt and ammonia generated by adding the humate solution were absorbed to obtain a urea premix.
(2) The humate solution at 80° C. with 18% mass concentration was added into a buffer tank equipped with a stirring and heating insulation system (maintained at 80° C.), and the foam control agent at 80° C. and the humate solution were mixed at a volume ratio of 200:500 and added into the buffer tank to obtain a humate premix. The humate premix was added into the urea premix via a metering pump (before the second evaporation section and after the suspension adsorbent was added), where 20 L of the humate premix was added per ton of urea.

Test Example 1

The two-component foam inhibitor prepared in Example 1 was subjected to foaming reaction and humate condensation tests:
(1) Foaming Reaction Test 3 groups of treatments were set up: T1 (ordinary urea melt), T2 (adding 15 L of humate solution per ton of urea melt), and T3 (each ton of the urea melt was added with 4 L of the suspension adsorbent and then the humate premix obtained by mixing 15 L of humate solution and 1.5 L of foam control agent). The urea melt was collected with a dropper and quickly dripped into liquid paraffin to obtain urea particles, and a density of the urea particles was measured (which indicated how much foaming occurred in the urea particles, and the smaller the density, the more foaming was).

Determination of the density of urea particles: a drainage method was adopted to determine the density of urea particles: 6.5 g of urea particles were weighed in T1, T2 and T3 separately and placed in a 50 mL graduated cylinder containing 30 mL of liquid paraffin, and the volume at this time was recorded. A difference subtraction method was adopted to calculate the volumes V1 (5.3 mL), V2 (6.0 mL), and V3 (5.1 mL) of the urea particles, and finally the density of the urea particles was calculated. The results were shown in Table 1.

Urea particle density=urea particle mass/urea particle volume.

TABLE 1

Influence of humate and two-component foam inhibitor on density of urea particles

| Group | Density (g/cm$^3$) |
| --- | --- |
| T1 | 1.22 |
| T2 | 1.08 |
| T3 | 1.27 |

According to Table 1, compared with ordinary urea granules (T1), the density of urea humate granules (T2) was reduced by 11.5%, and the density of humate+two-component foam inhibitor urea particles (T3) was increased by 4.1% and 17.6% compared with that in T1 and T2, respectively. This indicated that the two-component foam inhibitor provided by the present disclosure could solve the problem of foaming in the production process of urea humate.

The appearance of the urea particles was observed, and the foaming of the urea particles was observed. T1 urea particles had uniform particle size and the surface of the urea particles was smooth and round; T2 had low granularity and poor phase, the urea particles were not smooth, and the urea particles had pores; T3 had high granularity, desirable quality, smooth surface of urea particles and no air bubbles.
(2) Humate Condensation Test 3 groups of treatments were set up: H1, H2, and H3.

H1: the humate solution (pH=10.09) at 60° C. with 10% mass concentration was added into a beaker and stirred for 5 min on an 85-2A digital display constant-temperature magnetic stirrer (maintained at 60° C.).

H2: the humate solution at 60° C. with 10% mass concentration was added into a beaker on the above-mentioned magnetic stirrer (maintained at 60° C.), then added with the foam control agent at 60° C. (the foam control agent and humate solution with a volume ratio of 50:500), stirred for 5 min to obtain a humate premix with a pH at 6.10.

H3: the humate solution at 60° C. with 10% mass concentration was added into a beaker on the above-mentioned magnetic stirrer (maintained at 60° C.), then a potassium dihydrogen phosphate solution was slowly added into the humate solution to adjust a pH value of the humate solution to 6.10, and stirred for 5 min.

The viscosities of H1, H2, and H3 treatments were measured separately with a digital viscometer (SNB-2; temperature 20° C., rotation speed 60.0 RMP) to characterize the viscosity of humate solution. The smaller the viscosity, the smaller the coagulation degree and the stronger the fluidity of the humate solution were. The viscosity of the humate solution was shown in Table 2.

TABLE 2

Determination of viscosities of H1 to H3 humate solutions

| Group | Viscosity (mPa · S) |
| --- | --- |
| H1 | 1.31 |
| H2 | 5.64 |
| H3 | 342.6 |

According to Table 2, the viscosity of a humate solution with a mass concentration of 10% was 1.31 mPa·S and showed high fluidity. After adding the foam control agent, the pH value of the humate solution decreased and the viscosity increased slightly. When potassium dihydrogen phosphate was added to the humate solution, the humate condensed and precipitated seriously. The viscosity of H3 was 60.7 times that of H2. This indicated that the foam control agent in the two-component foam inhibitor provided by the present disclosure could increase the anti-coagulation ability and fluidity of the humate solution under moderately acidic conditions, thereby effectively solving the problem of foaming during the production of urea humate.

Test Example 2

The two-component foam inhibitor of Example 2 was subjected to dust test, particle strength test, and production efficiency calculation:

(1) Dust generation: for every 1 ton of ordinary urea humate produced, 5 kg to 12 kg of dust was generated; this method could reduce the amount of dust generated per ton of urea humate to 1 kg to 3 kg.

(2) Particle strength: the ordinary urea humate had a particle strength of 14 N to 16 N; this method could increase the particle strength of urea humate to 18 N to 20 N.

(3) Production efficiency: urea humate manufacturers generally reduced production capacity to reduce the generation of urea dust. When producing urea humate based on a daily output of 1,500 tons of urea, the daily output needed to be reduced to about 1,200 tons; this method could still maintain a daily output of 1,500 tons, and the production efficiency was greatly improved.

It can be seen from the above examples that the two-component foam inhibitor provided by the present disclosure can prevent the condensation of humate solution under non-alkaline conditions and effectively reduce the foaming phenomenon in the production process of urea humate. The method provided by the present disclosure can eliminate air bubbles, improve urea granulation rate, increase particle strength, reduce dust generation, and improve production efficiency.

Although the present disclosure is described in detail in conjunction with the foregoing examples, they are only a part of, not all of, the examples of the present disclosure. Other examples can be obtained based on these examples without creative efforts, and all of these examples shall fall within the protection scope of the present disclosure.

What is claimed is:

1. A method for reducing foaming in production of urea humate, comprising a first evaporation section and a second evaporation section, wherein a process between the first evaporation section and the second evaporation section comprises the following steps:
   (1) mixing a suspension adsorbent with a urea melt to obtain a urea premix;
   (2) mixing a humate solution and a foam control agent and heating to obtain a humate premix; and
   (3) mixing the urea premix with the humate premix.

2. The method according to claim 1, wherein the suspension adsorbent and the urea melt are at a volume-to-mass ratio of (2-5) L:1 t;
   the foam control agent and the humate solution are at a volume ratio of (50-200):500; and
   the humate solution has a mass concentration of 10% to 18%.

3. The method according to claim 1, wherein the humate premix and the urea melt are at a volume-to-mass ratio of (8-20) L:1 t.

4. The method according to claim 1, wherein the mixing and heating is conducted at 60° C. to 80° C.

\* \* \* \* \*